US012332592B2

(12) United States Patent
Kawasaki et al.

(10) Patent No.: US 12,332,592 B2
(45) Date of Patent: Jun. 17, 2025

(54) FIXING DEVICE INCLUDING HEATER RETENTION MEMBER, HAVING SLITS FORMED ON FACE OPPOSING INNER CIRCUMFERENTIAL SURFACE OF FIXING BELT, AND IMAGE FORMING APPARATUS

(71) Applicant: KYOCERA Document Solutions Inc., Osaka (JP)

(72) Inventors: Hiroki Kawasaki, Osaka (JP); Ryohei Tokunaga, Osaka (JP); Akihiro Kondo, Osaka (JP); Yuta Kitabayashi, Osaka (JP); Rina Kikugawa, Osaka (JP); Shunsaku Fujii, Osaka (JP); Yuto Masaoka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/586,955

(22) Filed: Feb. 26, 2024

(65) Prior Publication Data

US 2024/0288810 A1 Aug. 29, 2024

(30) Foreign Application Priority Data

Feb. 28, 2023 (JP) ................................ 2023-029705

(51) Int. Cl.
*G03G 15/20* (2006.01)

(52) U.S. Cl.
CPC ..... *G03G 15/2053* (2013.01); *G03G 15/2017* (2013.01); *G03G 15/2025* (2013.01); *G03G 2215/2035* (2013.01)

(58) Field of Classification Search
CPC ........... G03G 15/2017; G03G 15/2025; G03G 15/2053; G03G 2215/2035
USPC .......................................................... 399/329
See application file for complete search history.

(56) References Cited

U.S. PATENT DOCUMENTS 6,456,819 B1 * 9/2002 Abe .................. G03G 15/2064 399/329
11,467,521 B1 * 10/2022 Sone .................... G03G 15/206
2001/0019676 A1 * 9/2001 Okubo ............... G03G 15/2064 399/329
2015/0093167 A1 * 4/2015 Hazeyama ......... G03G 15/2064 399/329

(Continued)

FOREIGN PATENT DOCUMENTS

JP 2020197701 A 12/2020

*Primary Examiner* — Robert B Beatty
(74) *Attorney, Agent, or Firm* — IP Business Solutions, LLC.

(57) ABSTRACT

A fixing device includes a fixing belt formed in a cylindrical shape, with a lubricant applied to an inner circumferential surface, and set such that a circumferential surface rotates in a circumferential direction, a heater retention member that retains the heater, inside of the fixing belt, and a pressure member that defines a nip region, through which a recording medium is transported in a nipped state, between the pressure member and a portion of the fixing belt heated from inside by the heater, and drives the fixing belt to rotate. The heater retention member includes a first opposing face extending in a rotation axis direction of the fixing belt, and opposed to the inner circumferential surface of the fixing belt. The first opposing face includes slits aligned in the rotation axis direction of the fixing belt, and a lubricant is applied in advance inside the slits.

4 Claims, 6 Drawing Sheets

(56) References Cited

U.S. PATENT DOCUMENTS

| | | | | |
|---|---|---|---|---|
| 2017/0219969 | A1* | 8/2017 | Umeda .............. | G03G 15/2039 |
| 2018/0011434 | A1* | 1/2018 | Adachi .............. | G03G 15/2025 |
| 2018/0203384 | A1* | 7/2018 | Okamoto ........... | G03G 15/2025 |
| 2020/0379386 | A1 | 12/2020 | Watatani et al. | |
| 2023/0314987 | A1* | 10/2023 | Watatani ............ | G03G 15/2053<br>399/325 |

* cited by examiner

FIXING DEVICE INCLUDING HEATER RETENTION MEMBER, HAVING SLITS FORMED ON FACE OPPOSING INNER CIRCUMFERENTIAL SURFACE OF FIXING BELT, AND IMAGE FORMING APPARATUS

INCORPORATION BY REFERENCE

This application claims priority to Japanese Patent Application No. 2023-029705 filed on Feb. 28, 2023, the entire contents of which are incorporated by reference herein.

BACKGROUND

The present disclosure relates to a fixing device that fixes, by thermocompression, an image formed on a recording medium such as a recording sheet, and an image forming apparatus including the fixing device.

Existing image forming apparatuses that utilize the electrophotography process, such as a copier or a multifunction peripheral, include a fixing device that fixes the image formed on the recording medium. Some fixing devices include a rotatable cylindrical fixing belt, a heater that heats the fixing belt, a heater retention member that holds the heater so as to bring the heater into contact with the inner circumferential surface of the fixing belt, and a pressure member that holds the fixing belt between itself and the heater, and defines a nip region between itself and the fixing belt, through which the recording medium is transported in a nipped state, the pressure member being configured to drive the fixing belt to rotate. With such a configuration, the image formed on the recording medium is fixed thereto, by being heated and pressed (thermocompression) through the nip region.

To the inner circumferential surface of the fixing belt, a lubricant is applied. This is for the purpose of reducing the sliding friction between the fixing belt and internal components (e.g., heater retention member), thereby smoothening the rotation of the fixing belt. However, the lubricant applied to the inner circumferential surface of the fixing belt may migrate, because of the rotation of the fixing belt, toward the end portions of the fixing belt in the rotation axis direction, and leak to outside of the fixing belt.

Therefore, a fixing device has been developed that prevents the lubricant, applied to the inner circumferential surface of the fixing belt, from leaking to outside of the fixing belt, with slits formed on a side face of the heater retention member (side face in contact with the inner circumferential surface of the fixing belt), and aligned along the rotation axis direction of the fixing belt.

SUMMARY

The disclosure proposes further improvement of the foregoing techniques.

In an aspect, the disclosure provides a fixing device including a fixing belt, a heater, a heater retention member, and a pressure member. The fixing belt is formed in a cylindrical shape, with a lubricant applied to an inner circumferential surface, and set such that a circumferential surface rotates in a circumferential direction. The heater heats the fixing belt from inside thereof. The heater retention member retains the heater, inside of the fixing belt. The pressure member defines a nip region, through which a recording medium is transported in a nipped state, between the pressure member and a portion of the fixing belt heated from inside by the heater, and drives the fixing belt to rotate.

The heater retention member includes a first opposing face extending in a rotation axis direction of the fixing belt, and opposed to the inner circumferential surface of the fixing belt. The first opposing face includes slits aligned in the rotation axis direction of the fixing belt, and a lubricant is applied in advance inside each of the slits.

In another aspect, the disclosure provides an image forming apparatus including the foregoing fixing device, an image forming device, and a controller. The image forming device forms an image on a recording medium. The controller controls the fixing device and the image forming device.

DETAILED DESCRIPTION

Figure 1:
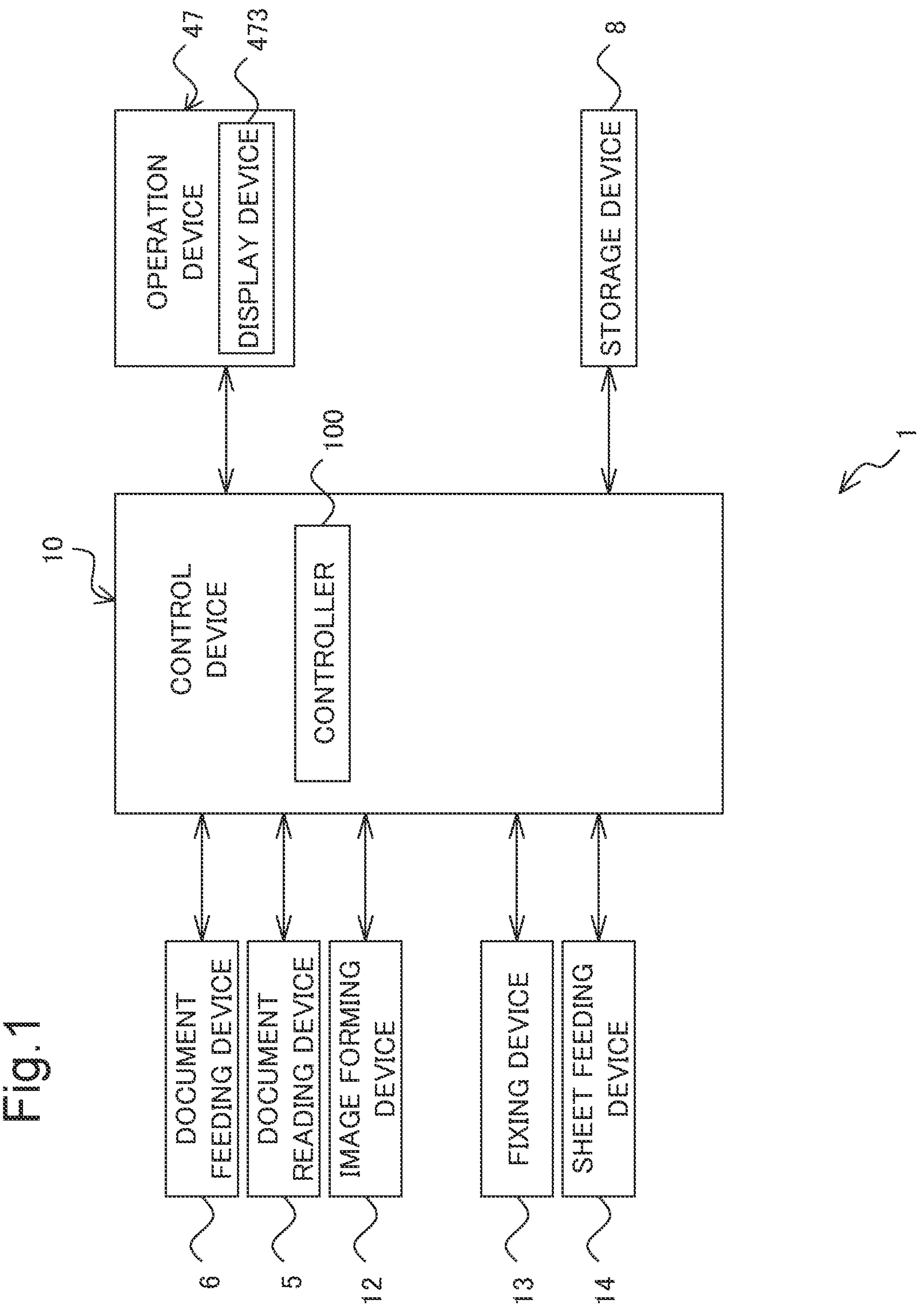
FIG. 1 is a functional block diagram schematically showing an essential internal configuration of an image forming apparatus according to an embodiment of the disclosure.

Hereafter, a fixing device and an image forming apparatus according to an embodiment of the disclosure will be described, with reference to the drawings. FIG. 1 is a functional block diagram schematically showing an essential internal configuration of the image forming apparatus according to the embodiment of the disclosure. The image forming apparatus 1 is a multifunction peripheral having a plurality of functions, such as copying, printing, scanning, and facsimile transmission.

The image forming apparatus 1 includes a control device 10, a document feeding device 6, a document reading device 5, an image forming device 12, a fixing device 13, a sheet feeding device 14, an operation device 47, and a storage device 8.

The document feeding device 6 is openably connected to the upper face of the document reading device 5, for example via a hinge. The document feeding device 6 serves as a document retention cover, when the document reading device 5 reads a source document placed on the platen glass. The document feeding device 6 is configured as an automatic document feeder (ADF) including a document tray, and delivers the source documents placed thereon to the document reading device 5.

To perform the document reading operation, the image forming apparatus 1 operates as follows. The document reading device 5 optically reads the image on the source document delivered from the document feeding device 6 to the document reading device 5, or placed on the platen glass, and generates image data. The image data generated by the document reading device 5 is stored, for example, in an image memory.

To perform the image forming operation, the image forming apparatus 1 operates as follows. The image forming device 12 forms an image on a recording sheet, serving as a recording medium, and delivered from the paper feeding device 14, on the basis of the image data generated through the document reading operation, image data stored in the image memory, or image data received from a computer connected via the network.

The fixing device 13 heats and presses the recording sheet on which the toner image has been formed by the image forming device 12, to thereby fix the toner image on the sheet. The recording sheet that has undergone the fixing process is delivered to an output tray. The sheet feeding device 14 includes one or more sheet cassettes.

The operation device 47 includes various hard keys, and receives instructions to execute the functions and operations that the image forming apparatus 1 is configured to perform, according to inputs made by the operator through the hard keys. The operation device 47 also includes a display device 473 for displaying, for example, an operation guide for the operator. The operation device 47 receives, through a touch panel provided on the display device 473, the user's instruction based on an operation (touch operation) performed by the operator on the operation screen displayed on the display device 473.

The display device 473 includes, for example, a liquid crystal display (LCD). The display device 473 includes the touch panel. When the operator touches a button or a key displayed on the screen, the touch panel receives the instruction corresponding to the touched position.

The storage device 8 is a large-capacity storage device, such as a hard disk drive (HDD) or a solid state drive (SSD), and contains various control programs.

The control device 10 includes a processor, a random-access memory (RAM), a read-only memory (ROM), and an exclusive hardware circuit. The processor is, for example, a central processing unit (CPU), an application specific integrated circuit (ASIC), or a micro processing unit (MPU). The control device 10 includes a controller 100.

The control device 10 acts as the controller 100, when the processor operates according to the control program stored in the storage device 8. Here, the controller 100 may be constituted in the form of a hardware circuit, instead of being realized by the operation of the control device 10 according to the control program. This also applies to other embodiments, unless otherwise specifically noted.

The controller 100 serves to control the overall operation of the image forming apparatus 1. The controller 100 is connected to the document feeding device 6, the document reading device 5, the image forming device 12, the fixing device 13, the sheet feeding device 14, the operation device 47, and the storage device 8, and controls the operation of the mentioned components. For example, the controller 100 controls the operation of the image forming device 12 and the fixing device 13, to execute a print job.

Figure 2:
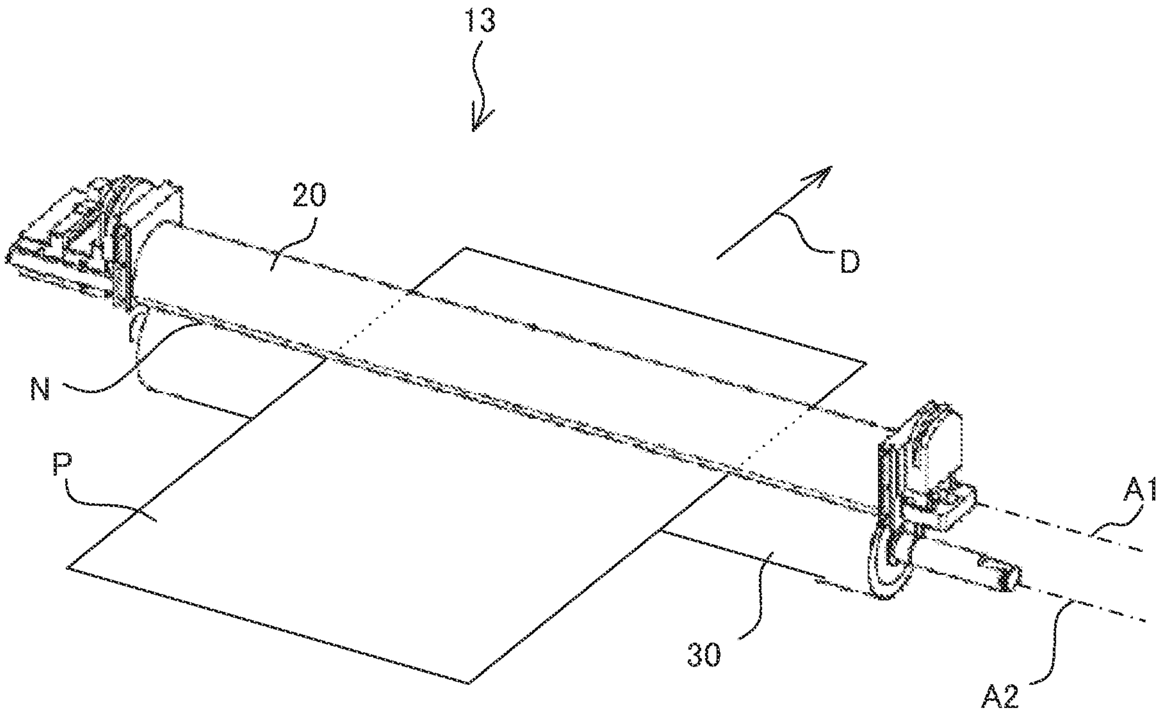
FIG. 2 is a perspective view showing an example of a fixing device included in the image forming apparatus.

FIG. 2 is a perspective view showing an example of the fixing device 13 included in the image forming apparatus 1. The fixing device 13 includes a rotatable cylindrical fixing belt 20, and a pressure member 30. The fixing belt 20 heats the recording medium (recording sheet P), having a toner image formed thereon. The fixing belt 20 is rotatable about an axial center defined as a first rotation axis A1, and extends in the direction of the first rotation axis A1.

The pressure member 30 is a roller rotatable about an axial center defined as a second rotation axis A2 parallel to the first rotation axis A1, and extends in the direction of the second rotation axis A2. The pressure member 30 defines a nip region N, through which the recording sheet P is transported in a nipped state, between the pressure member 30 and the fixing belt 20, and drives the fixing belt 20 to rotate. An arrow D in FIG. 2 indicates the transport direction of the recording sheet P.

Figure 3:
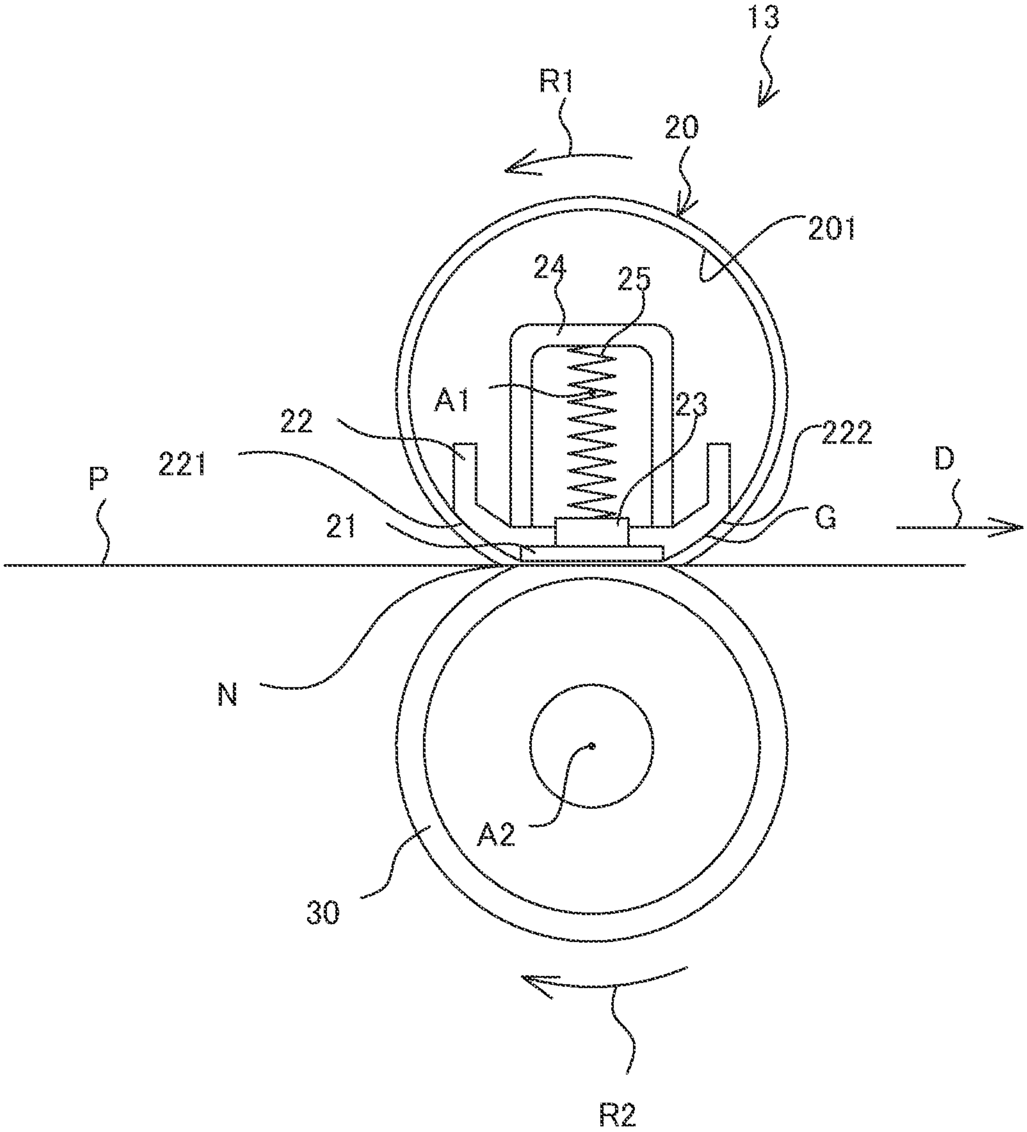
FIG. 3 is a cross-sectional view schematically showing the example of the fixing device.

FIG. 3 is a cross-sectional view schematically showing an example of the fixing device 13. The fixing device 13 includes the fixing belt 20, the pressure member 30, a heater 21, a heater retention member 22, a temperature sensor 23, a support member 24, and a biasing member 25.

The fixing belt 20 is driven to rotate in a first rotation direction R1 (counterclockwise in FIG. 3) about the first rotation axis A1, so as to follow up the rotation of the pressure member 30 in a second rotation direction R2 (clockwise in FIG. 3) about the second rotation axis A2. The fixing belt 20 is formed in a cylindrical shape, and the circumferential surface thereof rotates in the circumferential direction.

The heater 21 heats the fixing belt 20 from inside thereof. The heater 21 is a plane heater extending in the first rotation axis A1, and located inside of the fixing belt 20 so as to oppose an inner circumferential surface 201 of the fixing belt 20. The heater 21 may be, for example, a ceramic heater including a ceramic substrate and a resistive heating element.

The heater retention member 22 retains the heater 21, inside of the fixing belt 20. The heater retention member 22 is formed of a heat-resistant resin material, in a shape having a U-shaped cross-section and extending in the direction of the first rotation axis A1. The heater retention member 22 includes opposing faces 221 and 222, respectively located on the upstream side and the downstream side in the transport direction D of the recording sheet P, and opposed to the inner circumferential surface 201 of the fixing belt 20. The opposing face 221 is located on the upstream side, in the transport direction D.

The temperature sensor 23 is opposed to the heater 21, and detects the temperature of the heater 21. The temperature sensor 23 is fixed to a through hole formed in the heater retention member 22, so as to be abutted against the heater 21. The temperature sensor 23 may be, for example, a thermistor.

The support member 24 is a metal stay having an inverted U-shaped cross-section, and extending in the direction of the first rotation axis A1. The support member 24 is fixed to the main body housing of the fixing device 13. The heater retention member 22 is attached to the main body housing, so as to move toward and away from the support member 24. The support member 24 supports the posture of the heater retention member 22, when the end portion of the support member 24 on the side of the heater retention member 22 is in contact with the heater retention member 22.

The biasing member 25 is located between the temperature sensor 23 and the support member 24, and biases the heater retention member 22, the temperature sensor 23 and the heater 21 inclusive, toward the pressure member 30. The biasing member 25 may be, for example, a coil spring. The biasing member 25 serves to bring the heater retention member 22 into close contact with the inner surface of the fixing belt 20, thereby assisting the formation of the nip region between the fixing belt 20 and the pressure member 30. Here, the mentioned configuration is merely exemplary, and the disclosure is not limited to such configuration.

A lubricant G is applied to the inner circumferential surface 201 of the fixing belt 20. The lubricant G contributes to reducing the sliding friction between the fixing belt 20, and the heater 21 and the heater retention member 22, in the sliding region where the fixing belt 20 slides with respect to the heater 21 and the heater retention member 22, thereby smoothening the rotation of the fixing belt 20. In FIG. 3, the lubricant G is only shown in the sliding region.

Figure 4A:
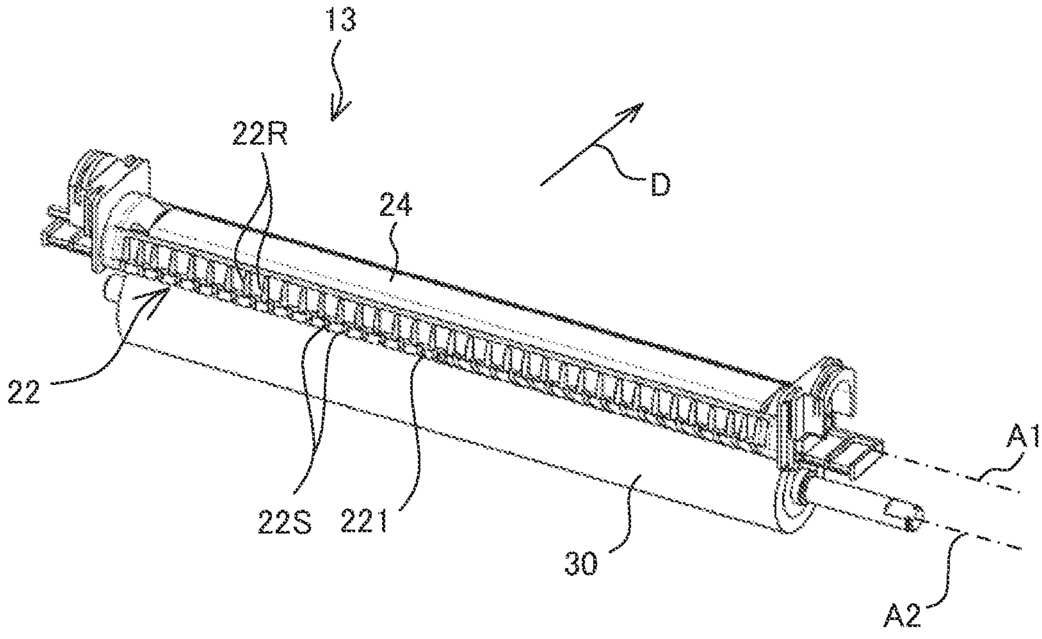
FIG. 4A is a perspective view showing the fixing device of FIG. 2, with a fixing belt excluded.
Figure 4B:
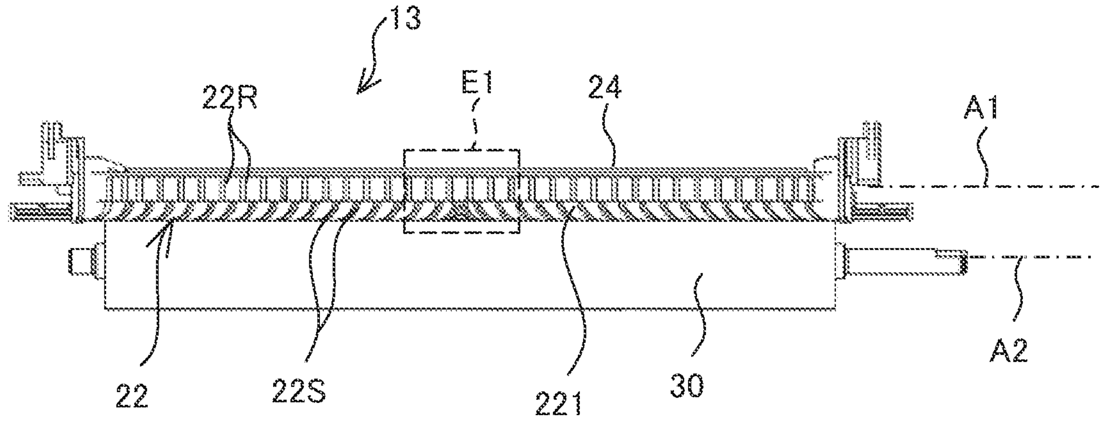
FIG. 4B is a side view showing the fixing device of FIG. 2, with the fixing belt excluded.

FIG. 4A is a perspective view showing the fixing device 13 of FIG. 2, with the fixing belt 20 excluded. FIG. 4B is a side view showing the fixing device 13 of FIG. 2, with the fixing belt 20 excluded, seen from the upstream side in the transport direction D.

The heater retention member 22 includes the opposing face 221 located on the upstream side in the transport direction D, and the opposing face 222 located on the downstream side in the transport direction D, as shown in FIG. 3. The opposing face 221 on the upstream side in the transport direction D includes a plurality of ribs 22R formed on the upper portion, and a plurality of slits 22S formed in the lower portion. The opposing face 222 on the downstream side in the transport direction D includes, like the opposing face 221, a plurality of ribs 22R formed on the upper portion. However, the opposing face 222 is without the slits 22S.

Figure 5A:
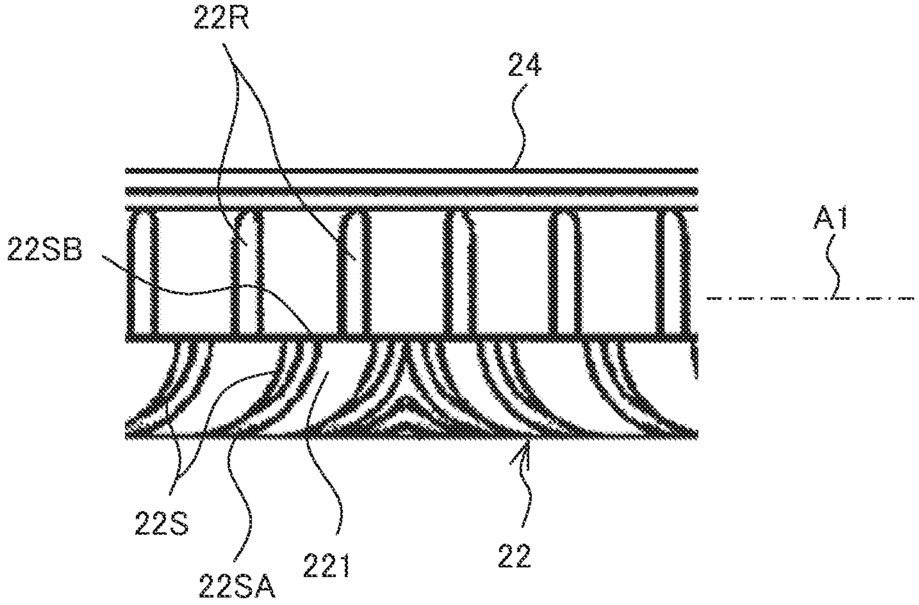
FIG. 5A and FIG. 5B are enlarged side views of a portion marked as E1 in FIG. 4B.
Figure 5B:
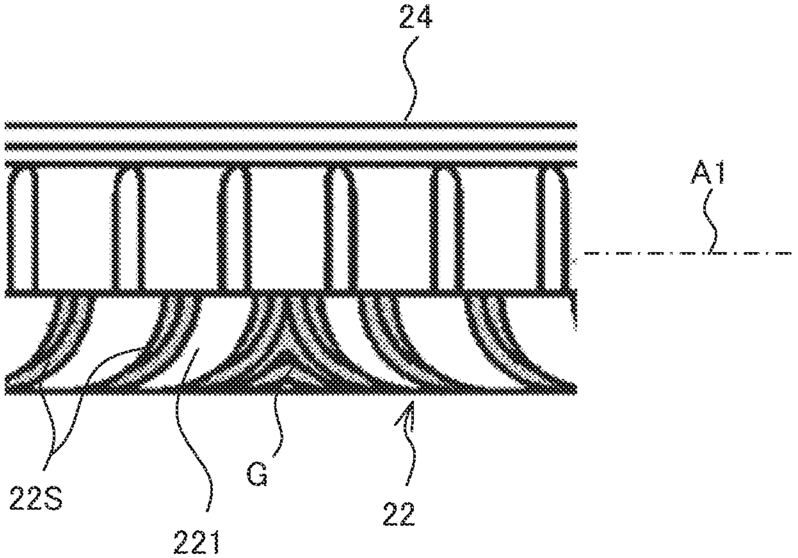

FIG. 5A and FIG. 5B are enlarged side views of a portion marked as E1 in FIG. 4B. The plurality of ribs 22R are aligned along the direction of the first rotation axis A1, at regular intervals. The plurality of ribs 22R serve to keep the fixing belt 20 in shape. The plurality of slits 22S are aligned along the direction of the first rotation axis A1.

The plurality of slits 22S each include an end portion 22SA on the side of the pressure member 30 (lower side in FIG. 5A and FIG. 5B), and the other end portion 22SB more distant from the pressure member 30 (upper side in FIG. 5A and FIG. 5B). The end portion 22SA is located on the outer side in the direction of the first rotation axis A1, with respect to the other end portion 22SB. The plurality of slits 22S are symmetrically located, with respect to the center in the direction of the first rotation axis A1. In the plurality of slits 22S, the lubricant G is applied in advance to the recessed portion, as shown in FIG. 5B.

In the fixing device 13, when the fixing belt 20 rotates to perform the fixing operation, the fixing belt 20 slides with respect to the heater 21 and the heater retention member 22 in the sliding region. However, the friction between the fixing belt 20, and the heater 21 and the heater retention member 22 is reduced by the lubricant G located in the sliding region (see FIG. 3), and the fixing belt 20 can smoothly rotate.

Now, the service life of the fixing device depends on the service life of each component constituting the fixing device, and a necessary amount of lubricant that fits the expected service life is provided in advance, inside the fixing belt, between the fixing belt and the heater. In the aforementioned existing fixing device, the lubricant is not provided in the slits, before the fixing device is put to use.

Accordingly, an abundant amount of lubricant has to be inevitably provided between the heater and the fixing belt, at the time that the fixing device starts to be used. The lubricant interposed between the heater and the fixing belt creates thermal resistance. Therefore, when an abundant amount of lubricant is provided, thermal conductivity is degraded such that the conduction of heat from the heater to the fixing belt is disturbed, which results in degradation in energy saving performance.

With the configuration according to the foregoing embodiment, in contrast, although the lubricant G applied to the inner circumferential surface 201 of the fixing belt 20 gradually decreases with the lapse of time, the loss of the lubricant G is compensated with the lubricant G exuding from the slits 22S of the opposing face 221, since the lubricant G is applied in advance in the slits 22S. Therefore, although the amount of the lubricant G, to be applied in advance to the inner circumferential surface 201 of the fixing belt 20, is reduced compared with the conventional devices, a sufficient amount of lubricant G, which fits the expected service life of the fixing device 13, can still be secured inside the fixing belt 20.

According to the foregoing embodiment, the lubricant G for compensating the loss with the lapse of time is secured in advance in the slits 22S, so that the lubricant G is supplied to the sliding region as necessary. However, in the case of the conventional devices, the necessary amount of lubricant that fits the expected service life of the fixing device 13 has to be provided in the sliding region (e.g., between the heater 21 and the fixing belt 20), from the time that the fixing device 13 starts to be used. With the arrangement according to the embodiment, in other words, the amount of the lubricant to be provided in the sliding region from the start of use can be reduced, compared with the conventional case, by an amount corresponding to the loss incurred with the lapse of time.

The reduction in amount of the lubricant G applied to the inner circumferential surface 201 of the fixing belt 20 naturally leads to reduction in amount of the lubricant G interposed between the heater 21 and the fixing belt 20. Therefore, the thermal resistance is reduced, and the degradation in thermal conductivity can be suppressed. Consequently, the energy saving performance can be improved, without compromising the service life of the fixing device 13.

Further, the slits 22S to which the lubricant G is applied are formed in the opposing face 221, located in the upstream portion of the heater retention member 22 in the transport direction D. In other words, the heater 21 is located downstream of the slits 22S, to which the lubricant G is applied, in the rotation direction of the fixing belt 20, and therefore the lubricant G exuding from the slits 22S can be promptly conducted to the proximity of the heater 21, to be replenished.

Figure 6:
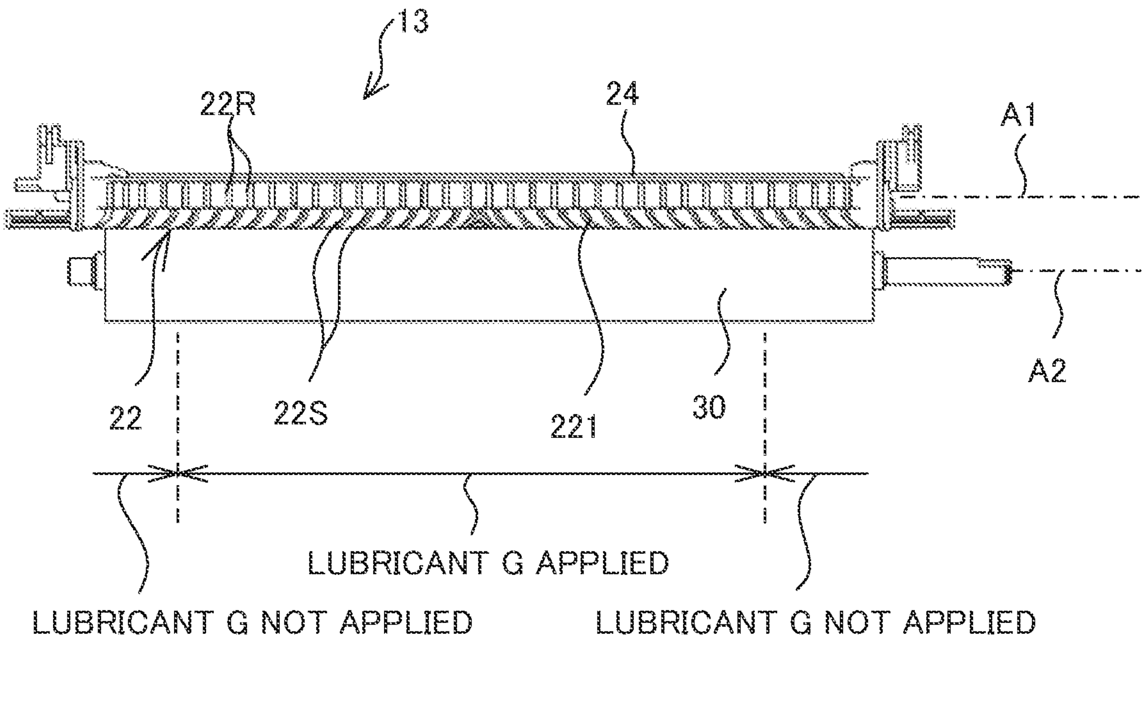
FIG. 6 is a side view showing a fixing device according to another embodiment.

Now, the lubricant G applied to the inner circumferential surface 201 of the fixing belt 20 migrates toward the end portions thereof in the direction of the first rotation axis A1, owing to the rotation of the fixing belt 20. Accordingly, as another embodiment, the lubricant G may only be applied to the slits 22S located in a central portion of the opposing face 22 in the direction of the first rotation axis A1, and the slits 22S located in the end portions in the direction of the first rotation axis A1 may be left without the lubricant G, as shown in FIG. 6.

In this case, recessed portions (slits 22S), to which the lubricant G is not applied, are provided in the end portions of the opposing face 221. Accordingly, the lubricant G that has migrated to the end portions can be introduced into the recessed portions, and therefore the lubricant G can be prevented from leaking to outside of the fixing belt 20, in particular in the rotation axis direction. Here, even when the lubricant G is not applied to the slits 22S located in the end portions, it is preferable to apply the lubricant G, not only to the central portion in the direction of the first rotation axis A1, but also to the end portions, of the inner circumferential surface 201 of the fixing belt 20.

Further, examples of the methods of applying the lubricant G to the slits 22S in the opposing face 221 include overlaying, on the slits 22S, a plate-shaped jig having openings formed only at the positions where the lubricant G is to be applied, and manually applying the lubricant G onto the slits 22S, via the plate-shaped jig.

The disclosure may be modified in various manners, without limitation to the foregoing embodiments. Further, the configurations and processings described in the foregoing embodiments with reference to FIG. 1 to FIG. 6 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. A fixing device comprising:

a fixing belt formed in a cylindrical shape, with a lubricant applied to an inner circumferential surface, and set such that a circumferential surface rotates in a circumferential direction;

a heater that heats the fixing belt from inside thereof;

a heater retention member that retains the heater, inside of the fixing belt; and a pressure member that defines a nip region, through which a recording medium is transported in a nipped state, between the pressure member and a portion of the fixing belt heated from inside by the heater, and drives the fixing belt to rotate, wherein the heater retention member includes a first opposing face extending in a rotation axis direction of the fixing belt, and opposed to the inner circumferential surface of the fixing belt, the first opposing face includes slits aligned in the rotation axis direction of the fixing belt, and a lubricant is applied in advance inside each of the slits, wherein the lubricant is not applied to the slits in predetermined end portions in the rotation axis direction.

2. The fixing device according to claim 1, wherein the heater retention member includes the first opposing face located on an upstream side in a transport direction of the recording medium, the first opposing face on the upstream side in the transport direction includes the slits, and the lubricant is applied in advance to the slits.

3. The fixing device according to claim 2, wherein the heater retention member further includes a second opposing face formed on a downstream side in the transport direction, extending along the rotation axis direction of the fixing belt, and opposed to the inner circumferential surface of the fixing belt, and the second opposing face is without the slits.

4. An image forming apparatus comprising:

the fixing device according to claim 1;

an image forming device that forms an image on a recording medium; and a controller that controls the fixing device and the image forming device.

* * * * *